(12) United States Patent
Dürnberger et al.

(10) Patent No.: US 10,221,502 B2
(45) Date of Patent: *Mar. 5, 2019

(54) POLYSACCHARIDE FIBERS AND METHOD FOR THE PRODUCTION THEREOF

(71) Applicant: LENZING AG, Lenzing (AT)

(72) Inventors: Franz Dürnberger, Lenzing (AT); Sigrid Redlinger, Lenzing (AT); Christoph Schrempf, Bad Schallerbach (AT); Hartmut Rüf, Schörfling (AT); Heinrich Firgo, Vöcklabruck (AT); Gert Kroner, Seewalchen (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 281 days.

This patent is subject to a terminal disclaimer.

(21) Appl. No.: 14/782,148

(22) PCT Filed: Apr. 4, 2014

(86) PCT No.: PCT/AT2014/000072
§ 371 (c)(1),
(2) Date: Oct. 2, 2015

(87) PCT Pub. No.: WO2014/161019
PCT Pub. Date: Oct. 9, 2014

(65) Prior Publication Data
US 2016/0053406 A1    Feb. 25, 2016

(30) Foreign Application Priority Data
Apr. 5, 2013  (AT) .................. A 257/2013

(51) Int. Cl.
| | | |
|---|---|---|
| *D01D 5/06* | (2006.01) | |
| *D01F 2/02* | (2006.01) | |
| *D01F 2/24* | (2006.01) | |
| *C08B 37/00* | (2006.01) | |
| *C08L 5/00* | (2006.01) | |
| *D04H 1/28* | (2012.01) | |
| *D04H 3/013* | (2012.01) | |
| *D01F 2/00* | (2006.01) | |
| *D01F 9/00* | (2006.01) | |
| *C08L 1/02* | (2006.01) | |
| *D21H 13/08* | (2006.01) | |
| *D04H 1/4258* | (2012.01) | |

(52) U.S. Cl.
CPC ........... *D01D 5/06* (2013.01); *C08B 37/0009* (2013.01); *C08L 1/02* (2013.01); *C08L 5/00* (2013.01); *D01F 2/00* (2013.01); *D01F 2/02* (2013.01); *D01F 2/24* (2013.01); *D01F 9/00* (2013.01); *D04H 1/28* (2013.01); *D04H 1/4258* (2013.01); *D04H 3/013* (2013.01); *D21H 13/08* (2013.01)

(58) Field of Classification Search
CPC .. D21H 3/02; D21H 13/08; D01F 2/02; D01F 2/06; D01F 2/08; C08L 1/02; C08L 1/24; C08L 5/02; C08B 37/0009; C08B 37/0021; D01D 5/06
USPC ....... 162/157.7; 264/188, 189, 178 F, 178 R, 264/205, 207; 536/123.1, 123.12
See application file for complete search history.

(56) References Cited

U.S. PATENT DOCUMENTS

| | | | |
|---|---|---|---|
| 2,179,181 A | 11/1939 | Graenacher et al. | |
| 2,914,414 A * | 11/1959 | Novak ..................... | C08L 1/24 106/162.6 |
| 3,447,939 A | 6/1969 | Johnson | |
| 3,600,379 A | 8/1971 | Sihtola et al. | |
| 3,844,287 A | 10/1974 | Smith | |
| 4,129,679 A | 12/1978 | Woodings | |
| 4,289,824 A | 9/1981 | Smith | |
| 4,306,059 A * | 12/1981 | Yokobayashi ........... | A23B 5/06 106/135.1 |
| 4,562,020 A | 12/1985 | Hiromi et al. | |
| 5,403,530 A | 4/1995 | Taylor | |
| 5,589,125 A | 12/1996 | Zikeli et al. | |
| 5,725,821 A | 3/1998 | Gannon et al. | |
| 5,795,522 A | 8/1998 | Firgo et al. | |
| 6,042,769 A | 3/2000 | Gannon et al. | |
| 6,113,842 A | 9/2000 | Weigel et al. | |
| 6,284,479 B1 | 9/2001 | Nichols | |
| 6,821,591 B2 | 11/2004 | Gord et al. | |
| 7,000,000 B1 | 2/2006 | O'Brien | |
| 9,175,423 B2 | 11/2015 | O'Brien et al. | |
| 9,701,800 B2 | 7/2017 | Durnberger et al. | |
| 10,030,323 B2 | 7/2018 | Durnberger et al. | |
| 2002/0022100 A1 | 2/2002 | Gord et al. | |

(Continued)

FOREIGN PATENT DOCUMENTS

| | | |
|---|---|---|
| AT | 287905 B | 2/1971 |
| AT | 402828 B | 9/1997 |

(Continued)

OTHER PUBLICATIONS

Singha, K., "Importance of the Phase Diagram in Lyocell Fiber Spinning", International Journal of Material's Engineering, (2012) pp. 10-16.

(Continued)

*Primary Examiner* — Eric Hug

(74) *Attorney, Agent, or Firm* — Venable LLP

(57) ABSTRACT

The present invention relates to a method for the production of polysaccharide fibers which, as a fiber-forming substance, comprise a mixture of cellulose and $\alpha(1{\rightarrow}3)$-glucan, as well as to the fibers made thereof and to their use.

6 Claims, No Drawings

(56) References Cited

U.S. PATENT DOCUMENTS

| | | | |
|---|---|---|---|
| 2002/0167110 A1 | 11/2002 | Schlossnikl et al. | |
| 2003/0185863 A1 | 10/2003 | Bengs et al. | |
| 2009/0165969 A1 | 7/2009 | Luo | |
| 2011/0200776 A1 | 8/2011 | Zikeli et al. | |
| 2013/0087938 A1* | 4/2013 | O'Brien | C08B 37/0009 264/8 |
| 2013/0161562 A1 | 6/2013 | O'Brien et al. | |
| 2013/0161861 A1 | 6/2013 | O'Brien et al. | |
| 2013/0244288 A1 | 9/2013 | O'Brien et al. | |
| 2013/0313737 A1 | 11/2013 | O'Brien | |
| 2014/0367896 A1 | 12/2014 | Zikeli et al. | |
| 2016/0053061 A1 | 2/2016 | Durnberger et al. | |
| 2016/0060792 A1 | 3/2016 | Durnberger et al. | |
| 2016/0138195 A1 | 5/2016 | Kraft et al. | |
| 2016/0138196 A1 | 5/2016 | Roder et al. | |
| 2016/0144065 A1 | 5/2016 | Roder et al. | |
| 2016/0177471 A1 | 6/2016 | Kraft et al. | |
| 2017/0283568 A1 | 10/2017 | Durnberger et al. | |

FOREIGN PATENT DOCUMENTS

| | | |
|---|---|---|
| CA | 1082866 A | 8/1980 |
| DE | 2550345 A1 | 5/1977 |
| DE | 3036415 A1 | 4/1981 |
| DE | 19544097 C1 | 7/1997 |
| DE | 10029044 A1 | 1/2002 |
| DE | 10035798 A1 | 1/2002 |
| DE | 10261496 A1 | 7/2004 |
| EP | 0 049 710 A1 | 4/1982 |
| EP | 0 158 884 A2 | 10/1985 |
| EP | 0 328 317 A1 | 8/1989 |
| EP | 0 356 419 B1 | 2/1990 |
| EP | 0 584 318 B1 | 3/1994 |
| GB | 2062652 A | 5/1981 |
| JP | 0351366 H | 3/1991 |
| JP | 2006-211989 A | 8/2006 |
| WO | 89/01062 A1 | 2/1989 |
| WO | 95/35340 A1 | 12/1995 |
| WO | 97/04148 A1 | 2/1997 |
| WO | 97/07266 A1 | 2/1997 |
| WO | 98/42492 A2 | 10/1998 |
| WO | 98/55673 A1 | 12/1998 |
| WO | 00/23250 A1 | 4/2000 |
| WO | 00/43580 A1 | 7/2000 |
| WO | 2012/073019 A1 | 6/2012 |
| WO | 2013/006876 A1 | 1/2013 |
| WO | 2013/020919 A1 | 2/2013 |
| WO | 2013/036918 A1 | 3/2013 |
| WO | 2013/030400 A1 | 3/2013 |
| WO | 2013/036968 A1 | 3/2013 |
| WO | 2013/052730 A1 | 4/2013 |
| WO | 2014/099724 A1 | 6/2014 |
| WO | 2014/165881 A1 | 10/2014 |

OTHER PUBLICATIONS

Simpson et al. "*Streptococcus salivarius*" Microbiology, vol. 41, (1995) pp. 1451-1460.

Schmidt, M., Lenzinger Berichte 9 (1994) pp. 95-97.

Ogawa, K., et al., "Crystal Structure of (1,3)-Alpha-D-Glucan", Water Soluble Polymers: Synthesis Solution Properties and Applications, American Chemical Society, vol. 141, (1980) p. 354.

Helfried Stover, "Zur Fasemassscheverung von Viskosefasern" Faserforschung and Textiltechnik 19, issue 10, (1968) pp. 447-452.

International Preliminary Report on Patentability and Written Opinion issued in International Application No. PCT/AT2014/000071 dated Oct. 6, 2015 (5 pages).

International Preliminary Report on Patentability and Written Opinion issued in International Application No. PCT/AT2014/000072 dated Oct. 6, 2015 (5 pages).

International Preliminary Report on Patentability and Written Opinion issued in International Application No. PCT/AT2014/000076 dated Oct. 13, 2015 (11 pages).

Akira Misaki, Elsinan, an Extracellular alpha 1,3:1,4 Glucan Produced by Elsinoe leucospila: Production, Structure, Properties and Potential Food Utilization, Foods Food Ingredients J. Jpn, vol. 209, No. 4, Jan. 1, 2004, available at: http://www.ffcr.or.jp/zaidan/ffcrhome.nsf/7bd44c20b0dc562649256502001b65e9/a574be4bca4c288149256e82000f39bb/$FILE/209(4)3.pdf.

Zhang, P. et al., Effects of urea and sodium hydroxide on the molecular weight and conformation of alpha-(1>3)-d-glucan from Lentinus edodes in aqueous solution, Carbohydrate Research, Pergamon, GB, Carbohydrate Research Pergamon, GB, vol. 327 No. 4 pp. 431-438, Aug. 7, 2000.

Rosenau et al., "The Chemistry of side reactions and byproduct formation in the system NMMO/cellulose (Lyocell process," Prog. Polym. Sci., vol. 26, pp. 1763-1837 (2001).

U.S. Appl. No. 16/007,641, filed Jun. 13, 2018.
U.S. Appl. No. 15/980,140, filed May 15, 2018.
U.S. Appl. No. 15/988,401, filed May 24, 2018.
U.S. Appl. No. 16/038,471, filed Jul. 18, 2018.
U.S. Appl. No. 15/932,303, filed Feb. 16, 2018.

\* cited by examiner

POLYSACCHARIDE FIBERS AND METHOD FOR THE PRODUCTION THEREOF

The present is a national stage filing under 35 U.S.C. § 371 of International Patent Application No. PCT/AT2014/000072, filed Apr. 4, 2014, which claims priority to Austrian Patent Application No. A257/2013 filed Apr. 5, 2013, the entire disclosure of each of which is incorporated by reference herein.

BACKGROUND OF THE INVENTION

Field of the Invention

The present invention relates to a method for the production of polysaccharide fibers which, as a fiber-forming substance, comprise a mixture of cellulose and $\alpha(1\to3)$-glucan, as well as to the fibers made thereof and to their use.

Description of Related Art

Polysaccharides are becoming increasingly important, as they are materials that can be obtained from renewable raw materials. One of the most frequently occurring polysaccharides is cellulose. Cotton fibers, which consist almost exclusively of cellulose, are an example of the significance of polysaccharides. However, also materials obtained from other cellulosic raw materials, e.g., cellulosic synthetic fibers, are continuing to gain in importance.

The generic name "lyocell fibers" was assigned by BISFA (the International Bureau for the Standardization of Manmade Fibers) to cellulose fibers produced from solutions in an organic solvent without the formation of a derivative.

However, to date, only one method for the large-scale production of fibers of the lyocell type has gained acceptance, namely, the amine-oxide process. In this method, a tertiary amine oxide, preferably N-methylmorpholine-N-oxide (NMMO), is used as the solvent.

Tertiary amine oxides have long been known as alternative solvents for cellulose. From U.S. Pat. No. 2,179,181, it is known, for example, that tertiary amine oxides are capable of dissolving pulp without derivatization and that cellulosic shaped bodies, e.g., fibers, can be made from these solutions. U.S. Pat. No. 3,447,939 describes cyclic amine oxides as solvents for cellulose.

From numerous patent specifications and other publications, it has been known to those skilled in the art for quite some time how this method is carried out. EP 356 419 B1, for example, describes how the solution is prepared, and EP 584 318 B1 describes how such solutions of cellulose in water-containing tertiary amine oxides are spun.

The main cellulosic raw material used in the amine oxide process is pulp obtained from wood. The cellulose molecules existing in wood and also in other plant-based sources of cellulose such as cotton linters, straw, etc. form very long chains, i.e., they exhibit a high degree of polymerization. In order to obtain a cellulose spinning solution that is well suited for large-scale processing, it is necessary to specifically adjust the degree of polymerization of the cellulose molecules, which inevitably causes part of the polymer molecules to be shortened. This takes place in the usual pulp preparation methods and also in separate pretreatment steps such as bleaching, acid treatment, or irradiation by splitting the originally long cellulose molecules. In addition to the shorter chains having the desired degree of polymerization, this also creates significantly shorter fragments such as oligomers or even monomers which remain in solution after the precipitation of the spinning solution in the precipitation bath, do not contribute to the formation of the fibers, and thus are lost. The quantities of raw material lost in this process can be substantial and can affect the cost-effectiveness of the entire amine oxide process.

U.S. Pat. No. 7,000,000 describes fibers obtained by spinning a solution of polysaccharides which substantially consist of repeating hexose units linked via $\alpha(1\to3)$-glycosidic bonds. These polysaccharides can be produced by bringing an aqueous solution of saccharose into contact with GtfJ glucosyltransferase, isolated from *Streptococcus salivarius* (Simpson et al. Microbiology, vol. 41, pp 1451-1460 (1995)). As used in this context, "substantially" means that within the polysaccharide chains there may exist occasional defective locations where other bond configurations may occur. For the purposes of the present invention, these polysaccharides are referred to as "$\alpha(1\to3)$-glucan".

U.S. Pat. No. 7,000,000 first discloses possibilities for the enzymatic production of $\alpha(1\to3)$-glucan from monosaccharides. In this way, relatively short-chained polysaccharides can be produced without the loss of monomer units, as the polymer chains are built from the monomer units. Contrary to the production of short-chained cellulose molecules, the production of $\alpha(1\to3)$-glucan keeps getting less expensive the shorter the polymer chains are, as in that case the required residence time in the reactors will be short.

According to U.S. Pat. No. 7,000,000, the $\alpha(1\to3)$-glucan is to be derivatized, preferably acetylated. Preferably, the solvent is an organic acid, an organic halogen compound, a fluorinated alcohol, or a mixture of such components. These solvents are costly and complex to regenerate.

Therefore, attempts were made to use $\alpha(1\to3)$-glucans instead of cellulose in an amine oxide process under commercially applied large-scale process conditions. Unfortunately, it was found that under these conditions $\alpha(1\to3)$-glucans could not be processed satisfactorily into fibers.

OBJECT

In view of such prior art, the object was to provide a polysaccharide fiber and a method for its production, which did not include the above mentioned disadvantages. The polysaccharide raw material was to be inexpensive to manufacture, and the processing method was to be known and cost-effective as well as executable on existing facilities.

DESCRIPTION OF THE INVENTION

The above described object is solved by a method for the production of a lyocell fiber, wherein the spinning solution comprises aqueous amine oxide and, as a fiber-forming substance, a mixture of cellulose and $\alpha(1\to3)$-glucan. For the purposes of the present invention, such a fiber shall also be referred to as a lyocell fiber even though it contains yet another fiber-forming polysaccharide in addition to cellulose, namely, the $\alpha(1\to3)$-glucan.

For the purposes of the present invention, the term "fiber" shall comprise both staple fibers having a defined staple length and continuous filaments. All principles of the invention that are described hereinafter apply, in principle, to both staple fibers and continuous filaments.

The single fiber titer of the inventive fibers can be between 0.1 and 10 dtex. Preferably, it is between 0.5 and 6.5 dtex, and more preferably between 0.9 and 3.0 dtex. In the case of staple fibers, the staple length is usually between 0.5 and 120 mm, preferably between 20 and 70 mm, and more preferably between 35 and 60 mm. In the case of continuous filaments, the number of individual filaments in the filament yarn is between 50 and 10,000, preferably between 50 and 3,000.

The α(1→3)-glucan can be prepared by bringing an aqueous solution of saccharose into contact with GtfJ glucosyltransferase isolated from *Streptococcus salivarius* (Simpson et al. Microbiology, vol. 41, pp 1451-1460 (1995)).

In a preferred embodiment of the method according to the invention, at least 90% of the α(1→3)-glucan are hexose units and at least 50% of the hexose units are linked via α(1→3)-glycosidic bonds.

The method for the preparation of the inventive fiber consists of the following steps:

1. Preparation of a spinning solution comprising aqueous amine oxide and, as a fiber-forming substance, a mixture of cellulose and α(1→3)-glucan, according to one of the two following methods:
   a. The α(1→3)-glucan can be added in the form of a solution in aqueous amine oxide to the cellulose solution prepared according to known methods.
   b. The α(1→3)-glucan can be admixed to the pulp already before the bringing into contact with aqueous amine oxide.
2. Extruding the spinning solution through a die, via an air gap, and into a spinning bath containing aqueous amine oxide, washing the regenerated fiber for removal of amine oxide, and drying.

The concentration of the fiber-forming substance in the spinning solution can be between 5 and 20% by weight, preferably between 8 and 15% by weight, and more preferably between 10 and 14% by weight.

The fiber-forming substance in the method according to the invention may comprise between 1 and 99% by weight of α(1→3)-glucan. Preferred is a content of the α(1→3)-glucan between 5 and 30% by weight and in particular preferred a content of the α(1→3)-glucan between 10 and 20% by weight. Below 5%, the economic benefit of the added α(1→3)-glucan is too low for typical types of use of the inventive fibers; above 30%, fibers may to an increasing extent be caused to stick together in the spinning process. However, under certain conditions and/or for certain types of use of the inventive fibers, both limits may be exceeded; the scope of the present invention expressly also includes fibers having an α(1→3)-glucan content between 1 and 5% by weight and between 30 and 99% by weight, respectively. For example, in the event of a low perforation density of the spinneret, i.e., a large spacing between the individual filaments in the air gap, the risk of sticking together is significantly lower.

The degree of polymerization of the α(1→3) glucan employed in the method according to the invention, expressed as weight average $DP_w$, can be between 200 and 2000; values between 500 and 1000 are preferred. Preferably, the amine oxide is N-methylmorpholine-N-oxide.

In the process according to the invention are also the following process parameters preferred: Extrusion temperature of the spinning solution at the dies between 90 and 135° C., preferably between 120 and 130° C.; output from the spinneret between 0.01 and 0.2 g/perforation*min, depending on the target single fiber titer, preferably between 0.02 and 0.1 g/perforation*min; length of the air gap between 7 and 70 mm, preferably between 20 and 35 mm; concentration of NMMO in the aqueous spinning bath between 0 and 35% by weight, preferably between 0 and 25% by weight.

A lyocell fiber that comprises cellulose and α(1→3)-glucan is also subject-matter of the present invention.

According to the invention, the fiber-forming substance of the inventive fiber can comprise between 1 and 99% by weight of α(1→3)-glucan. More preferably, the content of α(1→3)-glucan is between 5 and 30% by weight and in particular preferred a content of the α(1→3)-glucan between 10 and 20% by weight. Below 5%, the economic benefit of the added α(1→3)-glucan is too low for typical types of use; above 30%, fibers may to an increasing extent be caused to stick together. However, in certain cases and/or for certain types of use of the inventive fibers, both limits may be exceeded; the scope of the present invention expressly also includes fibers having an α(1→3)-glucan content between 1 and 5% by weight and between 30 and 99% by weight, respectively.

In a preferred embodiment, at least 90% of the α(1→3)-glucan of the inventive lyocell fiber are hexose units and at least 50% of the hexose units are linked via α(1→3)-glycosidic bonds.

The use of the inventive fibers for the production of textile products such as yarns, woven fabrics, or knitted fabrics is also subject-matter of the present invention.

Surprisingly, it was discovered that the inventive fibers are very well suited—even better than commercially available lyocell fibers without α(1→3)-glucan—to to produce textiles with peach-skin-effect by treatment methods generally known to those skilled in the art from the processing of lyocell fibers, for example, from Schmidt M., Lenzinger Berichte 9 (1994), pp 95-97. This suitability is due to the high fibrillation capability of the fibres according to the invention.

In order to remove fibrils, which appear in various treatment steps of the textile chain, from the fiber surface, often a so-called mechanical polishing step or also an enzymatic polishing step ("bio-polishing"; see for example Schmidt M., Lenzinger Berichte 9 (1994), pp 95-97) is employed. The inventive fibers are generally very well suited for use in a production method for textiles wherein such a step of mechanical or enzymatic polishing is employed. Hence, such use of the inventive fibers is also subject-matter of the present invention. Dyed fabrics (textiles) made out of the fibers according to the invention further show an improved white-abrasion behavior and after washing show less greying and less pilling.

The inventive fibers are particularly well suited for all products that can be produced in the dry or wet laying processes. This includes for example all paper applications and nonwoven fabrics, the so-called nonwoven products. Fibrillation can also be induced by strong mechanical impact on the fibers according to the invention when they are dispersed in a liquid like e.g. water. Suitable machines are e.g. refiners, which are well-known in paper industry. Compared to Lyocell fibers consisting of 100% cellulose the fibers according to the invention are forming fibrils of larger diameter which results in a particular good suitability of such fibrillated fibers for the nonwovens applications described above.

Furthermore, the inventive fibers are very well suited for all types of use where they are used in a greatly shortened form for the surface treatment of other shaped bodies or sheet-like structures. This includes surface coatings and flockings, among others. For this purpose, the inventive fibers are produced in lengths from 10 to approx. 500 μm, for example, by cutting or grinding in a cutting mill.

The invention will be described below with reference to examples. However, the invention is not expressly limited to these examples but also includes all other embodiments that are based on the same inventive concept.

EXAMPLES

The degree of polymerization of the α(1→3)-glucans was determined by means of GPC in DMAc/LiCl. Subsequently, it is always the weight average of the degree of polymerization ($DP_w$) that is specified.

Spinning solutions each containing 13% by weight of solids (cellulose+α(1→3)-glucan)/77% by weight of N-methylmorpholine-N-oxide/10% by weight of water were spun at 130° C. from a spinneret via an air gap (length 30 mm) in water. In the air gap, dry air (i.e., humidity=0% r.h.) was used for blowing at room temperature. The output from the spinneret was 0.05 g/perforation*min. The cellulosic raw material used was Saiccor pulp having a SCAN viscosity of 450 ml/g. α(1→3)-glucans having two different degrees of polymerization were used. The glucan quantities are related to the proportion of α(1→3)-glucan in the fiber-forming substance.

The properties of the fibers obtained are listed in Table 1:

TABLE 1

| example | additive | quantity of glucan % | titer dtex | FFk cN/tex | FDk % | FFn cN/tex | FDn % |
|---|---|---|---|---|---|---|---|
| 1 reference example | none | — | 1.58 | 34.2 | 10.1 | 27.0 | 11.9 |
| 2 | glucan $DP_w$ 1000 | 5 | 1.58 | 34.5 | 11.2 | 26.4 | 14.7 |
| 3 | glucan $DP_w$ 1000 | 10 | 1.59 | 31.8 | 10.7 | 20.9 | 14.7 |
| 4 | glucan $DP_w$ 1000 | 20 | 1.61 | 27.4 | 9.2 | 16.3 | 9.2 |
| 5 | glucan $DP_w$ 800 | 20 | 1.65 | 25.4 | 9.6 | 18.6 | 10.7 |

Therein means:
FFk fiber strength, conditioned
FDk fiber elongation, conditioned
FFn fiber strength, wet
FDn fiber elongation, wet

What is claimed is:

1. A method for the production of a lyocell fiber comprising:
   (a) preparing a spinning solution comprising an aqueous amine oxide and a fiber-forming substance, wherein said fiber forming substance is a mixture of cellulose and α(1→3)-glucan; and
   (b) extruding the spinning solution into a spinning bath to obtain said lyocell fibers.

2. The method according to claim 1, wherein the fiber-forming substance comprises between 1 and 99% by weight of α(1→3)-glucan.

3. The method according to claim 1, wherein the amine oxide is N-methylmorpholine-N-oxide.

4. The method according to claim 1, wherein at least 90% of the α(1→3)-glucan are hexose units and at least 50% of the hexose units are linked via α(1→3)-glycosidic bonds.

5. The method according to claim 1, wherein the fiber is selected from the group consisting of a staple fiber and a continuous filament.

6. The method according to claim 2, wherein the fiber-forming substance comprises between 5 and 30% by weight of α(1→3)-glucan.

* * * * *